Oct. 5, 1954     E. R. BERGMANN     2,690,836
SHAKER CONVEYER

Filed Nov. 29, 1950     7 Sheets-Sheet 1

INVENTOR.
*Ernst R. Bergmann*
BY
*Murray A. Gleeson*
ATTORNEY Oct. 5, 1954 E. R. BERGMANN 2,690,836
SHAKER CONVEYER
Filed Nov. 29, 1950 7 Sheets-Sheet 7

INVENTOR.
Ernst R. Bergmann
BY
Murray A. Gleeson
ATTORNEY

Patented Oct. 5, 1954

2,690,836

UNITED STATES PATENT OFFICE 2,690,836

SHAKER CONVEYER

Ernst R. Bergmann, Chicago, Ill., assignor to Goodman Manufacturing Company, Chicago, Ill., a corporation of Illinois Application November 29, 1950, Serial No. 198,202

10 Claims. (Cl. 198—220)

This invention relates to improvements in shaker conveyors and more particularly relates to an improved and simplified feeder head for automatically extending or retracting an extensible shovel trough of a shaker conveyor with respect to a shaker conveyor trough line.

The invention relates particularly to low-priced lightweight shaker conveyor feeding mechanisms made for extreme mobility in very low ceiling mines.

Patent 2,434,127, issued January 2, 1948, to W. W. Sloane, is an example of a conventional shaker conveyor feeder head. The present invention, however, differs in that a single pair of holding cams, directly operable by the control lever, is mounted for engagement with the stops on the links which feed the extensible trough forward and backward. This provides for a greatly simplified and less expensive arrangement, as contrasted with the plurality of indirectly operated cams employed in the structure of the above-mentioned patent.

Patent Re. 21,027 issued to Ernst R. Bergmann is another example of a shaker conveyor feeding head showing the conventional sliding shoe employed to support the rear end of the shovel trough directly on the ground. The present invention obviates the necessity of using a sliding shoe and instead guides the shovel trough on the feeder trough by means of longitudinally spaced guide formations which guidably support the shovel trough for straight telescopical movement relative to the feeder trough. With this construction is used, where necessary, as for instance in varying ground levels, a vertically pivotal connection between the feeder trough and the main trough line so the shovel end of the shovel trough may remain in frictional engagement with the ground at all times regardless of roll and pitch of the floor.

Other objects and advantages will be apparent from the following description taken in connection with the accompanying drawings in which.

Referring now more particularly to the drawings, the preferred embodiment of the present invention includes generally a reciprocable feeder trough 21 and a shovel trough 22 which is extensible and retractible relative to it.

The feeder trough is connected to the receiving end of a shaker conveyor trough line (not shown), by means of a pair of connecting eyes 23, and is reciprocably driven therefrom.

The forward portion of the feeder trough (Fig. 8) is provided with two pairs of upstanding brackets 24 and 26, each carrying a pair of inner guide rollers 27 and 28 which are employed to support the shovel trough, as will be described. On the left side of the feeder trough (as seen when facing forwardly), between the brackets 26, is an upstanding plate 29 carrying a laterally spaced bracket 31 which supports the feeding mechanism hereinafter described.

The shovel trough is provided at its forward end with the usual shovel 32 and side rails 33.

Figure 1:
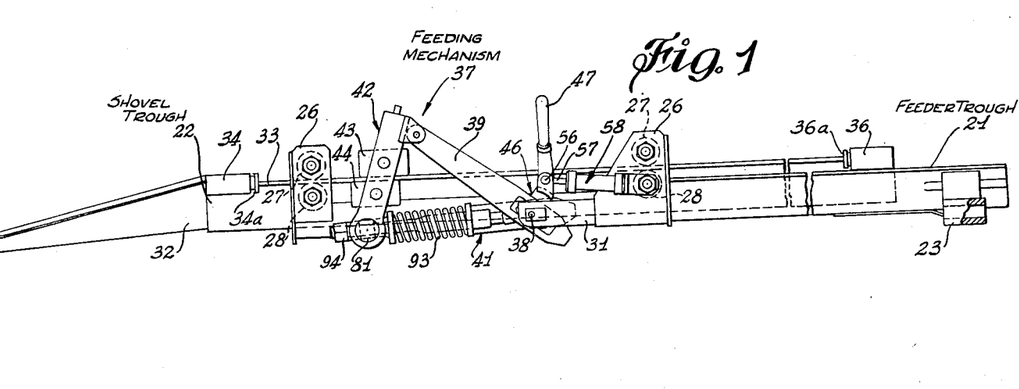
Figure 1 is a view in side elevation of the inby end of a shaker conveyor trough line having a feeder head constructed in accordance with the present invention.
Figure 2:
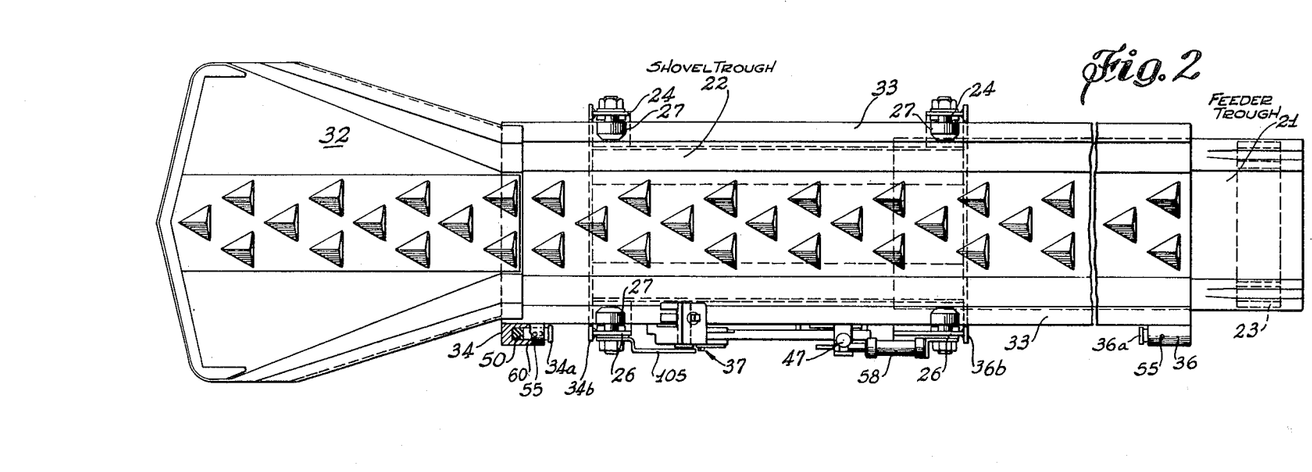
Fig. 2 is a plan view of Fig. 1.
Figure 8:
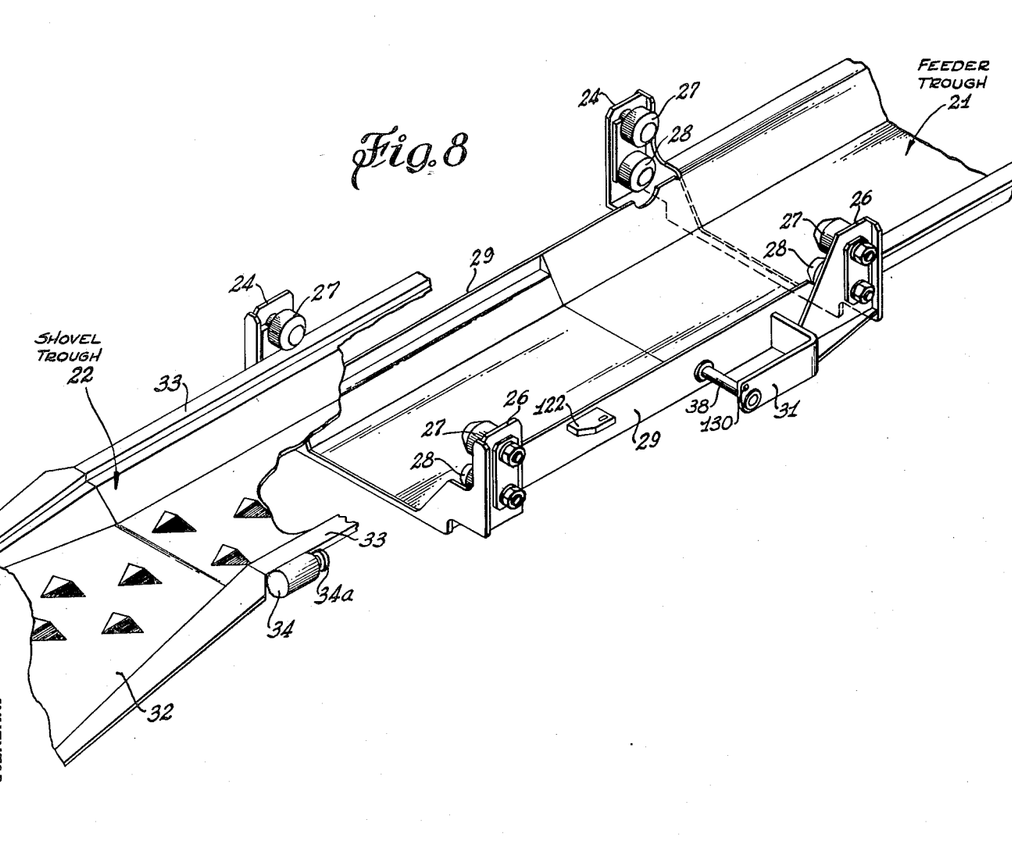
Fig. 8 is a cut-away perspective view showing how the extensible trough is guided for movement along the feeder trough.

As shown in Figs. 1, 2 and 8, the side rails 33 are supported between the feeder trough rollers 27 and 28. Front and rear stops 34 and 36, having striker pads 34a and 36a, respectively, are provided for limiting extension and retraction of the shovel trough. The striker pads are each preferably resiliently-mounted, as by rubber cushion means 50 (Fig. 2). Pad 34a engages plate 34b carried by the feeder trough for limiting retraction; and pad 36a engages feeder trough plate 36b for limiting extension. Each of pads 34a and 36a is held by a pin 55 fitted through a longitudinal slot formed in it and mounted in the housing 60.

So far, the structure described is conventional.

The present invention resides in the improved and simplified feeding mechanism generally designated 37 which will now be described in detail.

A short, transverse shaft 38 is mounted between the feeder trough left hand side plate 29 and the end of the bracket 31. This shaft serves as a pivotal support for the feeding mechanism which includes an upper, retracting link 39 pivotally mounted on the shaft 38; a lower, extending link 41 likewise pivotally mounted on shaft 38; a carrier member 42 pivotally mounted between the forward ends of the links and carrying grip blocks 43 and 44 which are engageable with the left-hand rail 33; and cam means 46 attached to the handle 47, the cam means likewise being mounted for rotation about the shaft 38.

Figure 4:
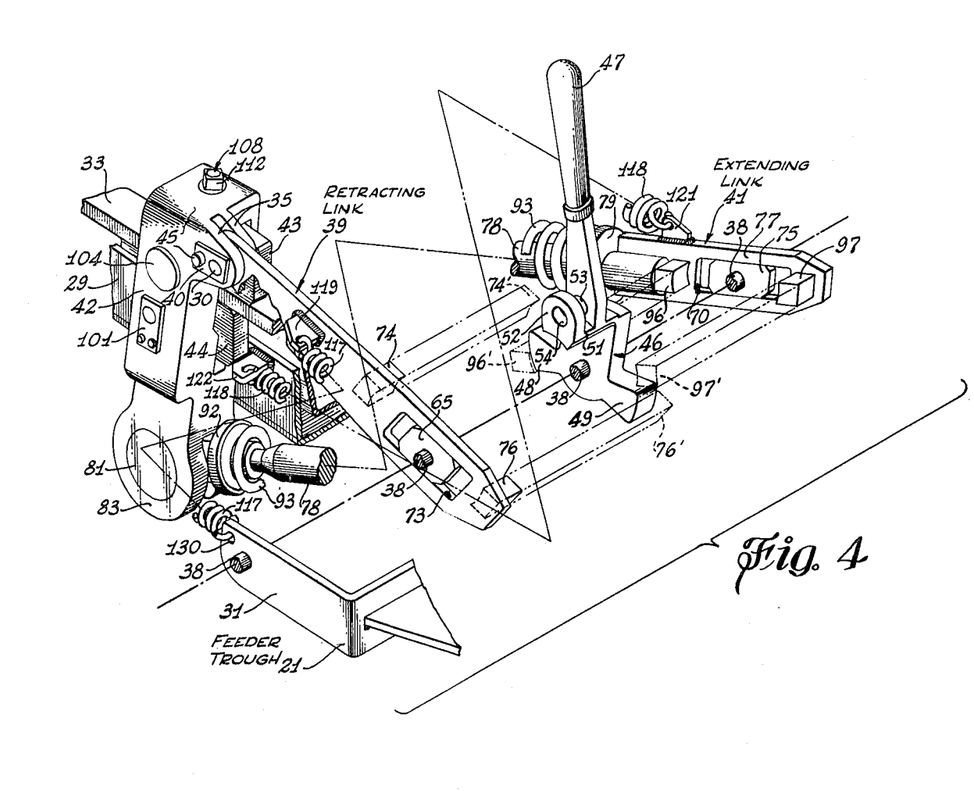
Fig. 4 is an expanded perspective view of a number of the operating parts shown in the previous views.

As shown in Fig. 4, the cam means 46 is formed with a forward cam sector 48 and a rearward sector 49 having an outwardly offset section 51 from which upstands the handle 47 and an ear 52. The handle 47 and the ear 52 are apertured at 53 and 54, respectively, to receive a pin 56 (Fig. 1) on which is pivotally mounted a centralizing rod 57 extending from the centering mechanism 58.

Figure 3:
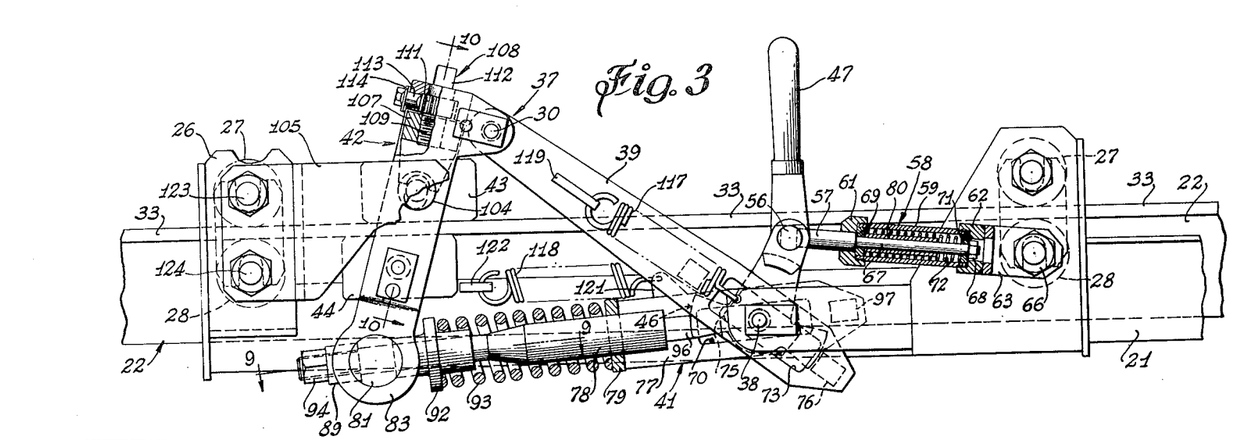
Fig. 3 is a fragmentary enlarged view of Fig. 1.

As best shown in Fig. 3, the centering means comprises a tubular body 59 which is end-threaded for caps 61 and 62, respectively. The rear end cap is provided with a welded-on angle 63 apertured at 64 for engagement with mounting bolt 66 for one of the rear rollers 28. Internally of the housing 59, the rod 57 has a reduced-diameter portion 67 which is threaded at its end to receive nut 68. The reduced-diameter portion 67 is provided with a pair of collars 69 and 71 biased apart by compression spring 72.

Encircling, and in sliding engagement with, the reduced diameter 67 of the rod 57 is a sleeve 80 which, due to its shorter length, constitutes a floating stop against which collars 69 and 71 will come to rest when the handle 47 is moved to actuate the cam means 46. Thus, sleeve 80 acts as a governor in limiting movement of the handle 47.

Figure 5:
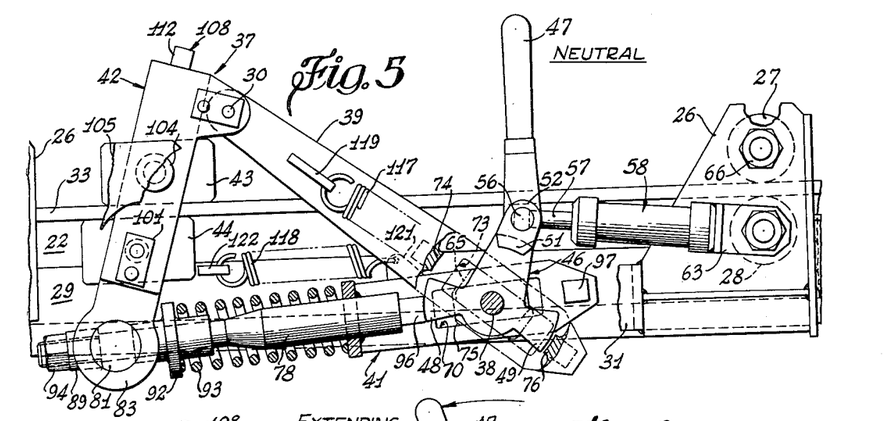
Fig. 5 is a fragmentary view of the feeding mechanism in side elevation, with the control lever for operating the feeding mechanism shown in a neutral position and with certain parts of the feeding mechanism shown in substantially longitudinal section.

Figs. 3 and 5 show the neutral position of the handle 47 where it will be held by the centering device 58 except when it is manually held in a forward (Fig. 6) or a rearward (Fig. 7) position. By pulling the handle 47 rearward, collar 69 (together with sleeve 80) will be moved backward to further compress the spring 72 until sleeve 80 comes to rest against collar 71, thereby making it unstable in that position; likewise, moving the handle forward will move the collar 71 and sleeve 80 forward thereby compressing the spring from the other direction making it unstable in that position. Releasing the handle from either the Fig. 6 or Fig. 7 position will result in its being automatically centered to the Figs. 3 and 5 position.

As shown in Figs. 3, and 4, the link 39 is formed with a rectangular slideway 73 within which is carried a slide block 65 which in turn is rotatably mounted on the shaft 38, exteriorly of the cam means 46. On its inner side, the link 39 is provided a pair of stops 74 and 76 which are disposed forwardly and rearwardly of the shaft 38, respectively. As will be seen subsequently, these stops cooperate respectively with the cam sectors 48 and 49 in retracting the shovel trough. The forward end of the link 39 is pivotally mounted on pin 30 carried between ears 35 extending from the back side of the carrier member. Pin 30, itself, is carried by a small plate 40 affixed to the exterior of the carrier by means of a cap screw 45.

Figure 9:
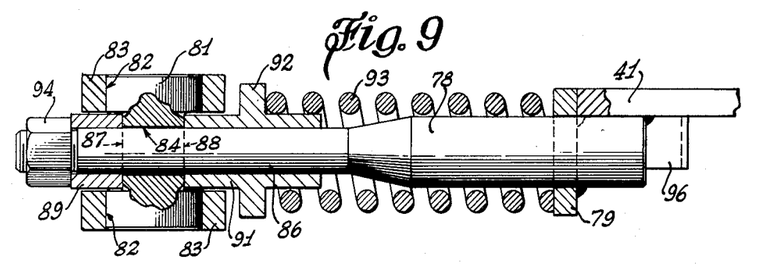
Fig. 9 is a sectional view of the extending link taken along the line 9—9 in Fig. 3.

The extending link 41, which is so designated because it functions to extend the shovel trough, as will be hereinafter described, is a composite structure, being compressible so as to "give" when the shovel trough meets a resistance of overload proportions. The details of the extending link are best shown in Figs. 3 and 9. It comprises a rear plate portion 77 which is vertically on edge and in which the slideway 70 for slide block 75 is formed. Slide block 75 is pivotally mounted on shaft 38. Attached to the plate portion 77, as by welding, is a forwardly extending rod portion 78 surrounded by a rear collar 79. At the other end, as best shown in Fig. 9, a trunnion 81 is journaled in the transverse openings 82 formed in the lower bifurcations 83 of the carrier 42. The trunnion is provided with a circular bore 84 extending longitudinally of the conveyor and adapted to receive the reduced diameter portion 86 of the rod 78. The trunnion is also provided with front and rear flat faces 87 and 88 adapted to abut respectively with bushings 89 and 91, the latter having a collar or flange 92. A coil spring 93 is compressibly interposed between the two collars 79 and 92 (Fig. 3). An adjusting nut 94 on the forward end of the reduced rod portion 86 is provided to preload the spring 93 to any desired value for limiting the amount of forward thrust that may be applied to the shovel trough. Thus, it will be seen that when a forwardly-directed load is applied to the plate portion 77 of link 41, it will be transmitted through the spring 93 to the collar 92 of bushing 91, and thence through the trunnion 81 to the carrier member. When the thrust exceeds the setting of the spring it will simply be compressed to relieve the overload by tilting the carrier to let the grip blocks slip.

Figure 3A:
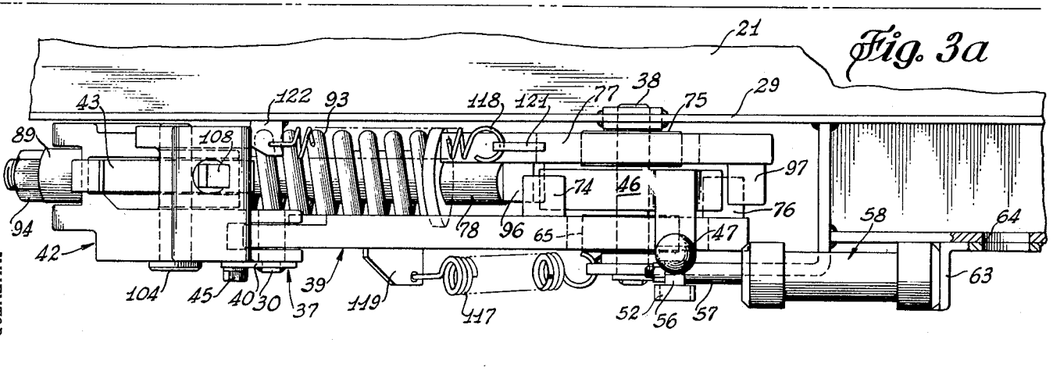
Fig. 3a is a plan view of a portion of the mechanism shown in Fig. 3.

As best shown in Figs. 3a and 4, the extending link 41 has, on its outer side (that is, the side facing the cam member 46) a pair of stops 96 and 97 disposed forwardly and rearwardly of the shaft 38 and being engageable, respectively, with the cam sectors 48 and 49.

Figures 10, 11, 12:
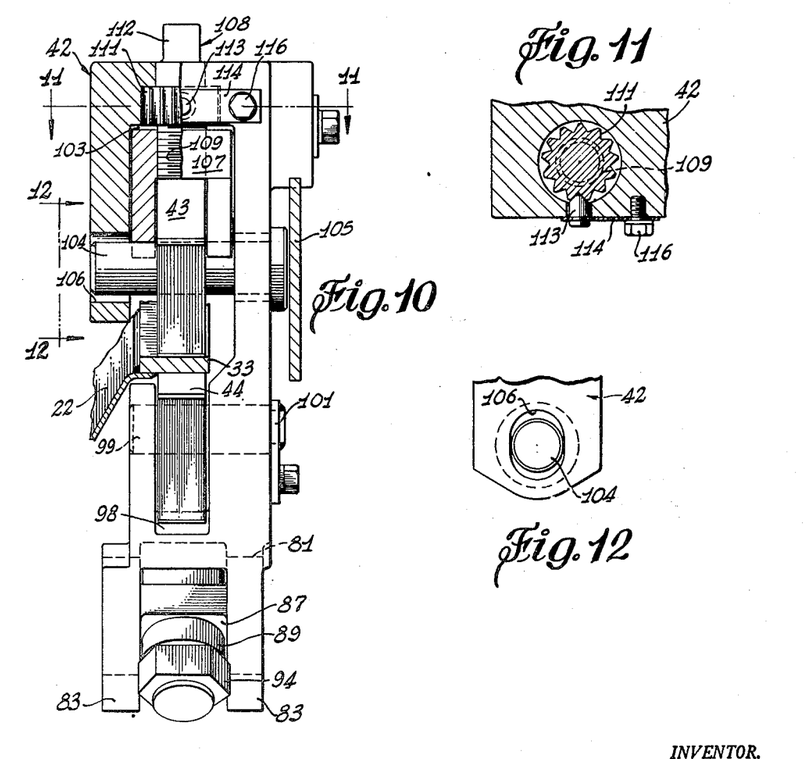
Fig. 10 is a transverse view of the upper portion of the carrier taken partly in section along the line 10—10 of Fig. 3.
Fig. 11 is a cross-sectional view of Fig. 10 taken along the line 11—11.
Fig. 12 is a cross-sectional view of Fig. 10 taken along the line 12—12.

The grip blocks and their adjusting means will now be described for the purpose of completing the disclosure of a workable mechanism. As best shown in Fig. 10, the lower grip block 44 is disposed wiithin a longitudinal slot 98 in the carrier and is pivotally supported on a pin 99 which itself is carried by a smaller rectangular plate 101 affixed by cap screw 102 to the exterior of the carrier. As likewise shown in Fig. 10, the upper portion of the carrier is formed with an inverted U-section having a space 103 therewithin. Within that space, and pivotal on pin 104, is the upper grip block 43. The pin 104 is carried in vertically elongated slots 106 (Fig. 12) to provide for up and down adjusting movement of the grip block 43 by means now to be described. An inverted, U-shaped pressure block 107 (Fig. 10) straddles the upper grip block and bears upon the vertically movable pin 104. A holding plate 105 is fastened on the forward feeder trough bracket 26 by bolts 123 and 124 (which retain the rollers 27, 28) and extends backward to serve the dual function of retaining the pin 104 and limiting excessive lateral shifting of the carrier 42. An adjusting stud, generally designated 108, has a lower threaded end portion 109 threadably engaged with the block 107; it has an intermediate ratchet portion 111 (Fig. 11), the top shoulder of which is backed-up by a corresponding shoulder in the carrier; and it has an outer, squared portion 112 for engagement with a wrench. A dog 113, carried by a spring plate 114, is in engagement with the ratchet for holding it in any set position. The spring 114 is mounted by means of cap screw 116 engaged with the carrier.

Thus, it will be apparent that when the grip blocks and the rails 33 wear, this condition may be corrected simply by tightening down on the adjusting stud 108.

It will be noted that, as is customary practice, the carrier 42 is inclined so the pivot point for the upper grip block is behind that for the lower grip block. With this arrangement, the grip blocks can be maintained snugly in engagement with the side rail 33 by urging backward on the upper part of the carrier and urging forward on the lower part of the carrier.

Figure 6:
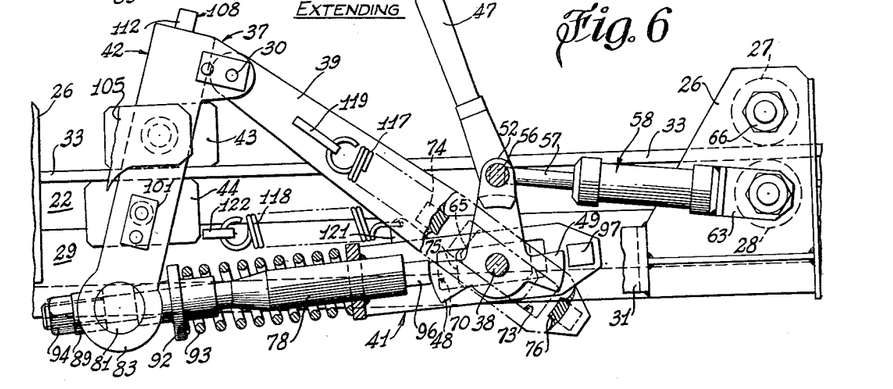
Fig. 6 is a fragmentary view similar to Fig. 5 but showing the control lever and its associated parts in position to extend the extensible trough of the conveyor.
Figure 7:
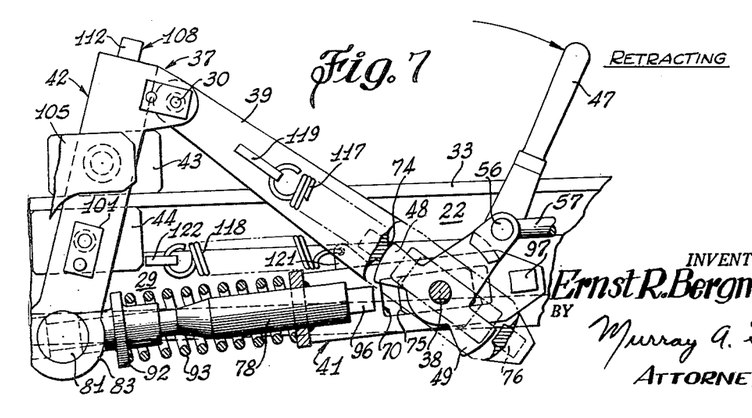
Fig. 7 is a view similar to Figs. 5 and 6 but showing the control lever and associated parts in position to retract the extensible conveyor trough.

This is done, mechanically, by means of tension springs 117 and 118. As best shown in Fig. 4, one end of spring 117 is attached to a plate 119 carried by link 39 and the other end is mounted in an opening 130 (see also Fig. 8) on the forwardly extending bracket 31 of the feeder trough. One end of spring 118 is connected to plate 121 carried by the link 41 and the other end is mounted on a bracket 122 carried by the feeder frame portion 29 (see also Fig. 8). In order to better understand the relationship between the cam sectors 48—49 and the stops 74—76 and 96—97, the parts in Fig. 4 have been expanded out of their normal engaging relationships. To show how the stops and cam sectors do cooperate, the stops have been elongated in phantom as indicated 74', 76', 96', and 97'. Thus, Fig. 4, taken in conjunction with whichever of Figs. 5, 6 and 7 is appropriate, illustrates the positions of the parts in the "neutral," "extending," and "retracting" conditions, respectively.

Figure 13:
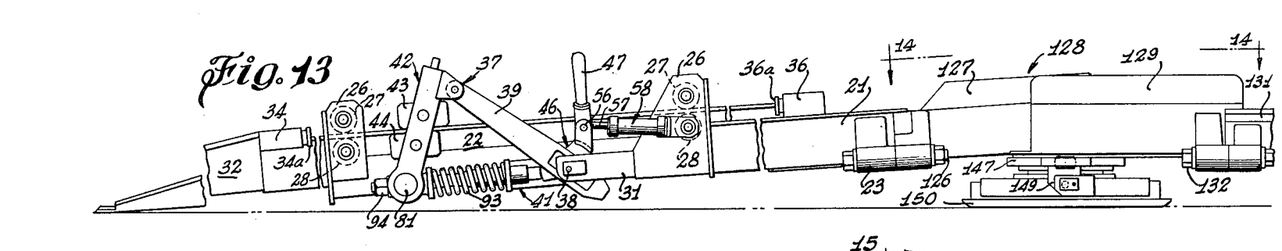
Fig. 13 is a view in side elevation of the entire feeding mechanism from the shovel end of the shovel trough back to and including the swivel trough connected to the main trough line.
Figure 14:
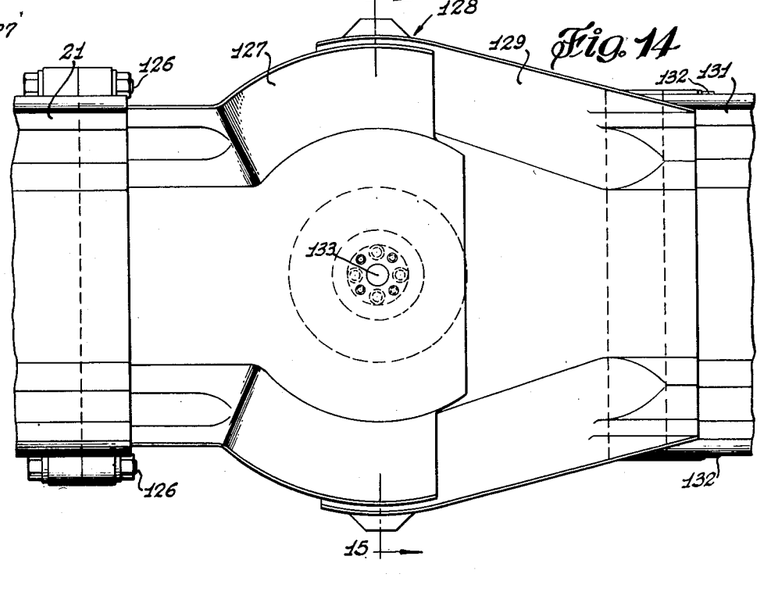
Fig. 14 is a fragmentary enlarged view of Fig. 13 taken along the line 14—14 showing a plan view of the swivel trough.
Figure 15:
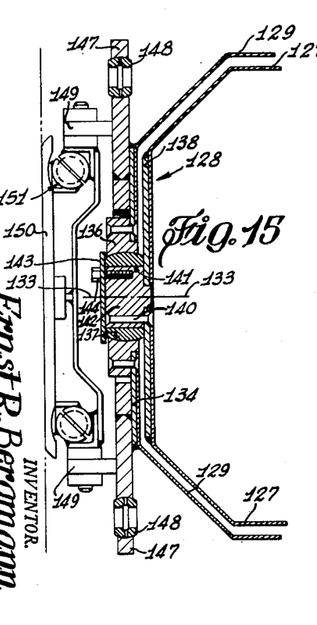
Figure 15 is a transverse view partly in section of Fig. 14 taken along the line 15—15.

As best shown in Figs. 13, 14 and 15 the feeder trough 21 is connected by bolts 126 to the forward trough section 127 of the swivel trough, generally designated 128. The rear section 129 of the swivel trough is connected to the main trough line 131 by bolts 132. Swivel trough sections 127 and 129 are constructed in the conventional manner, being relatively pivotable about axis 133—133 (Fig. 15) to permit the duckbill to swing from one side of a room to another.

For the duckbill to operate satisfactorily the weight at the front end must be carried, on the ground, by the shovel in order to provide sufficient frictional engagement between the shovel and the ground to permit the grip blocks to slide along the guide rail during extension and retraction. For normally flat ground contours and mildly undulating floor levels there will be enough flexibility in the conventional structure to permit the shovel to satisfactorily engage the ground. Where the floor level rises and falls repeatedly however it is desirable to provide for some up and down pivotal adjustability somewhere between the feeder trough and the main trough line. In the present case this is done by providing a universal pivotal joint between the two sections of the swivel trough 128.

Referring to Fig. 15 this universal pivotal mounting and its associated parts comprises a plate 134 mounted as by welding on the underside of the trough section 129, to reinforce it, beneath the plate 134 and attached as by welding is a pad 136 having a spherical race 137 formed within it. The trough section 127 has a reinforcing plate 138 welded to the underside. A ball shaped bearing ring 139 is fitted within the race 137 and has a bore 141 within which is a solid bushing 142, the latter being attached to the reinforcing plate 138 by means of rivets 140. A retaining plate 143 is disposed to cover both members 139 and 142 and the assembly is held together by means of bolts 144 extending through the plate 143, and threadably engaged within the bushing 142. It will be observed that there is a space 146 and another space 147 between the plates 138, 143 and the pad 136 to permit the two sections of the swivel trough to be universally pivotal with respect to one another.

The remainder of the swivel trough is conventional and may be described briefly as a mounting plate 147 having a ball bushing 148 for connection to the swinging link of a pendulum jack (not shown). Lower extensions 149 on both sides of the plate 147 provide a pivotal connection with a conventional ball frame, generally designated 151, having a ground contacting plate 150. For details of the ball frame reference should be made to Patent 1,807,110, issued May 26, 1931, to R. A. Walter.

Thus, it will be seen that when the feeding mechanism is used in service where the floor level undulates sharply, and where the natural flexibility in the feeding trough, swivel trough and associated parts is insufficient to allow the full weight of the forward portion of the mechanism to be pressed by the shovel against the ground to obtain the desired operative frictional engagement therewith, the vertical adjustability resultant from the use of the ball joint in the swivel trough will achieve the desired purpose. Thus, it will be seen that while the shovel 32 supports the forward portion of the mechanism, the rear portion is supported by the ball frame 151 beneath the swivel trough.

*Operation*

Before describing the detailed operation of the feeding mechanism, the general principles will first be outlined. It will be understood that when the conveyor is in use the feeder trough will continuously be reciprocated back and forth to provide the necessary motive power for extending or retracting the shovel trough, as well as imparting movement for transferring material downstream of the conveyor troughs. The transverse shaft 38 which is carried by the feeder trough, and which likewise carries the grip blocks through the links and carrier member, also reciprocates with the feeder trough.

For extending the shovel trough, the grip blocks must be caused to grip the shovel trough on successive forward strokes of the feeder trough and to release it on successive rearward strokes; conversely, to retract the feeder trough, the grip blocks must be caused to grip the shovel trough on successive rearward strokes and to release it on successive forward strokes. It will be understood that when the grip blocks release the shovel trough and move backward or forward relative to it the shovel trough will remain stationary during such relative movement by reason of the operative frictional engagement of the front end of the shovel trough with the ground since the weight of it is permitted to be pressed against the ground due to the flexibility in the troughs combined with the action of the universal pivotal connection in the swivel trough. For the neutral condition, in which the shovel trough is neither extending nor retracting, but is merely reciprocated back and forth with the feeder trough, the grip blocks must be caused to grip during both the forward and rearward strokes.

Now, referring in more detail to the operation of the feeding mechanism, reference should be made to Figs. 4 and 5 where the parts are shown in their "neutral" condition. In this condition the cam sector 48 is in line to engage the extending link stop 96 and the cam sector 49 is in line to engage the retracting link stop 76. The sector 48 does not engage stop 74; likewise the sector 49 does not engage the stop 97. Under this set of conditions, toward which the cam is urged by the centering means 58, a forward load will be applied to the bottom of the carrier, through the extending link 41, during the forward stroke of the feeder trough; and a rearward load will be applied to the upper part of the carrier member through the retracting link 39 during the rearward stroke of the feeder trough. Thus, during both forward and rearward strokes, the tendency is to twist the carrier clockwise to cause the grip blocks to grip the shovel rail 33 tightly.

For the extending operation, refer to Figs. 4 and 6. Here the cam sectors 48 and 49 are aligned, respectively, with the extending link stops 96 and 97. They are not aligned to engage the stops 74 and 76. Under these conditions, during the forward stroke load will be transmitted through the link 41, tending to twist the carrier clockwise to hold the grip blocks tight. During the reverse stroke the bottom of the carrier will be pulled backward, tending to twist it counter-clockwise thereby causing it to release the grip blocks and permits them to be drawn backward along the shovel trough for a successive "bite" at a position further back.

For the retracting operation, refer to Figs. 4 and 7. Here, the cams 48 and 49 are aligned, respectively, with the retracting link stops 74 and 76. They do not engage stops 96 and 97. Under this set of conditions, during the forward stroke of the feeder trough the carrier will be tilted counter-clockwise by load transmitted through the link 39 causing the grip blocks to release and to slip along the shovel trough rail 33 to take a new "bite" at a forward position. Then, on the succeeding rearward stroke, the pull exerted through the link 39 on the upper part of the carrier will tend to tilt the latter clockwise to cause the grip blocks to grip the shovel trough and pull it backward.

From the foregoing it will be seen that the present invention represents a considerable advance, in the form of a clearly simplified mechanism for extending and retracting a shaker conveyor shovel trough, the crux of the present invention residing in a simple two-headed direct-manually-operated holding cam which is movable to an "extending" position for engaging the stops 96 and 97 on the extending link 41; which is movable to a "retracting" position to engage the stops 74 and 76 on the retracting link; and which is movable to an intermediate "neutral" position where the sector 48 engages the extending link stop 96 and the sector 49 engages the retracting link stop 76.

While one form in which the present invention may be embodied has been shown, it will be understood that the construction thereof and the arrangement of the various parts may be altered without departing from the spirit and scope thereof. Furthermore, the invention should not be construed as limited to the specific embodiment illustrated, excepting as it may be limited in the appended claims.

I claim:

1. In a feeding mechanism for shaker conveyors, two reciprocating troughs, one of which is extensible with respect to the other, a carrier member, a link connecting one end of said carrier member with one of said troughs, friction grip means mounted on said carrier member for engagement with the other of said troughs, a hand lever carried by said one trough, a pair of spaced stops carried by said link, a holding cam carried by said lever and movable thereby to and from a position of engagement with said stops to cause said link to exert a force on said carrier member in a direction to grip said grip blocks with their respective trough during alternate strokes of the conveyor and thereby move said extensible trough with respect to the other.

2. In a feeding mechanism for shaker conveyors, two reciprocating troughs, one of which is extensible with respect to the other, a carrier member, a link connecting each end of said carrier member with one of said troughs, a hand lever carried by said one trough, a stop carried by each of said links, a holding cam carried by said lever and movable thereby to and from a position of engagement with both of said stops, to cause each of said links alternately to exert a force on said carrier member in a direction to grip said blocks with their respective trough during successive strokes of the conveyor and thereby hold the two troughs against relative movement when desired.

3. In a feeding mechanism for shaker conveyors, two reciprocating troughs, one of which is extensible with respect to the other, a carrier member, each end of said carrier member having a link connecting it with one of the troughs, a hand lever carried by said one trough, a pair of spaced stops carried by each of said links, a holding cam carried by said lever and movable thereby to and from positions of engagement with said stops in which said holding cam is engageable with both stops of either link to cause said link to exert a force on said carrier member in a direction to grip said grip blocks with their respective trough during alternate strokes of the conveyor and thereby move said extensible trough with respect to the other, and in which said holding cam is engageable with one stop on each link to cause said links alternately to exert a force on said carrier member in a direction to grip said grip blocks with their respective trough during successive strokes of the conveyor and thereby hold the two troughs against relative movement.

4. In a feeding mechanism for shaker conveyors, two reciprocating troughs, one of which is extensible with respect to the other, a carrier member, a transverse control shaft carried by one of said troughs, a link connecting one end of said carrier member with said shaft and being rectilinearly movable with respect to the latter, friction grip means mounted on said carrier member for engagement with the other of said troughs, a hand lever carried by said shaft, a pair of stops carried by said link on opposite sides of said shaft, a holding cam carried between said stops by said shaft and movable, responsive to movement of said lever, to and from a position of engagement with both of said stops to hold said link from rectilinear movement with respect to said shaft, to cause said link to exert a force on said carrier member in a direction to grip said grip blocks with their respective trough during alternate strokes of the conveyor and thereby move said extensible trough with respect to the other.

5. In a feeding mechanism for shaker conveyors, two reciprocating troughs, one of which is extensible with respect to the other, a carrier member, a transverse control shaft carried by one of said troughs, a pair of links, each connecting one end of said carrier member with said shaft and being rectilinearly movable with respect to the latter, friction grip means mounted on said carrier member for engagement with the other of said troughs, at least one hand lever carried by said shaft, a pair of mutualy facing stops carried by each link, each pair being disposed on opposite sides of said shaft, a two-headed holding cam carried by said lever and movable therewith to and from one position where each of the cam heads engage, respectively, the pair of stops on one of the links to hold said link from rectilinear movement with respect to said shaft and to cause said link to exert a force on said carrier member to grip said grip blocks with their respective trough during alternate strokes of the conveyor and thereby move said extensible trough with respect to the other; and to another position where each of the cam heads engage, respectively, one stop on each of said links located on opposite sides of said shaft to cause each of said links alternately to exert a force on said carrier member in a direction to grip said grip blocks with their respective trough during successive forward and backward strokes of the conveyor to thereby hold the two troughs against relative movement.

6. In a feeding mechanism for shaker conveyors, two reciprocating troughs, one of which is extensible with respect to the other, one of said troughs having a longitudinally extending guide rail, friction grip means carried by the other trough and selectively actuatable to grip said rail during forward and backward strokes to telescopically extend and retract said extensible trough responsive to reciprocation of the trough carrying the friction grip means, guide means on said other trough mounted in fixed alignment with the axis of said other trough and being engageable with a substantial length of said guide rail to guidably support the extensible trough for straight telescopical movement relative to the other, ground-engaging supporting means at the front end of the extensible trough and at the rear end of the other trough, respectively, the latter trough being connected through swivel trough means to a reciprocable shaking conveyor trough-line, and means acting between said latter trough and said trough line providing for vertical adjusting movement of said troughs to maintain the ground-engaging supporting means at the front end of the extensible trough in operative frictional engagement with the ground regardless of up-and-down variations in ground contour.

7. In a feeding mechanism for shaker conveyors, two reciprocating troughs, one of which is extensible with respect to the other, rolling guide means disposed at longitudinally spaced locations on one of said troughs in fixed alignment with the axis of said one trough and engaging the other trough to guidably support the extensible trough for straight telescopical movement relative to the other, friction grip means between said troughs and selectively actuatable to telescopically extend and retract said extensible trough responsive to reciprocation of the other trough, ground-engaging supporting means at the front end of the extensible trough and at the rear end of the other trough, respectively, the latter trough being connected through swivel trough means to a reciprocable shaking conveyor trough-line, and means acting between said latter trough and said trough line providing for vertical adjusting movement of said troughs to maintain the ground-engaging supporting means at the front end of the extensible trough in operative frictional engagement with the ground regardless of up-and-down variations in ground contour.

8. In a feeding mechanism for a reciprocable shaking conveyor trough line, a swivel trough connected to said trough line, a feeder trough connected to said swivel trough, a shovel trough nested within said feeder trough and extensible with respect thereto, friction grip means carried by said feeder trough and selectively actuatable to grip said shovel trough during forward and backward strokes to telescopically extend and retract said shovel trough responsive to reciprocation of said feeder trough, guide means acting between said feeder and shovel troughs and in fixed alignment with the axes thereof to guidably support the shovel trough for straight telescopical movement relative to the feeder trough, ground-engaging supporting means on the shovel trough and on the swivel trough, respectively, and means between said shovel trough and said trough line providing for vertical adjusting movement of said feeder trough to maintain the ground-engaging supporting means on the shovel trough to follow up-and-down variations in ground level.

9. In a feeding mechanism for a reciprocable shaking conveyor trough line, a swivel trough connected to said trough line, a feeder trough connected to the opposite side of said swivel trough, a shovel trough nested within said feeder trough and extensible and retractible therein, a longitudinal rail carried by said shovel trough, friction grip means carried by said feeder trough and selectively actuatable to grip said shovel trough during forward and backward strokes to telescopically extend and retract said shovel trough responsive to reciprocation of said feeder trough, guide means acting between said feeder and shovel troughs and in fixed alignment with the axes thereof to guidably support the shovel trough for straight telescopical movement relative to the feeder trough, said guide means comprising a plurality of vertically spaced rolling members mounted on a forward portion of the feeder trough and disposed to engage a length of said shovel trough rail, ground-engaging supporting means on the forward end of said shovel trough, the trough line- and feeder trough-connecting end portions of said swivel trough being vertically pivotable with respect to one another to permit the ground-engaging shovel trough supporting means to follow up-and-down variations in ground level while maintaining operative frictional contact therewith.

10. In a feeding mechanism for a reciprocable shaking conveyor trough line, a swivel trough connected to said trough line, a feeder trough connected to the side of said swivel trough remote from said trough line, a shovel trough nested within said feeder trough and extensible and retractible therein, friction grip means carried by said feeder trough and selectively actuatable to grip said shovel trough during forward and backward strokes to telescopically extend and retract said shovel trough responsive to reciprocation of said feeder trough, substantially frictionless guide means acting between said feeder and shovel troughs in fixed alignment with the axes thereof and effective to guidably support the shovel trough for straight telescopical movement relative to the feeder trough, ground-engaging supporting means on the forward end of said shovel trough for carrying the weight of the forward portion of said feeding mechanism, ground-engaging supporting means on the swivel trough for carrying the weight of the rear portion of said feeding mechanism, said troughs being provided with sufficient vertical adjustability about said swivel trough to permit the ground-engaging means on the shovel to follow up and down variations in the floor level while maintaining operative frictional engagement therewith.

References Cited in the file of this patent

UNITED STATES PATENTS

| Number | Name | Date |
|---|---|---|
| 2,317,089 | Schafer | Apr. 20, 1943 |
| 2,332,176 | Sloane | Oct. 19, 1943 |
| 2,355,452 | Linkowski | Aug. 8, 1944 |
| 2,434,127 | Sloane | Jan. 6, 1948 |